(12) United States Patent
Son et al.

(10) Patent No.: US 12,291,082 B2
(45) Date of Patent: May 6, 2025

(54) COMPRESSION MODULE FOR VEHICLE

(71) Applicants: Hyundai Motor Company, Seoul (KR); Kia Corporation, Seoul (KR)

(72) Inventors: Ji Wan Son, Yongin-si (KR); Seong-Bin Jeong, Hwaseong-si (KR); Dong Seok Oh, Hwaseong-si (KR); Wan Je Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 230 days.

(21) Appl. No.: 18/053,995

(22) Filed: Nov. 9, 2022

(65) Prior Publication Data
US 2023/0415546 A1    Dec. 28, 2023

(30) Foreign Application Priority Data

Jun. 24, 2022  (KR) ........................ 10-2022-0077328

(51) Int. Cl.
| | |
|---|---|
| *B60H 1/32* | (2006.01) |
| *F04B 39/06* | (2006.01) |
| *F04B 39/14* | (2006.01) |
| *F25B 31/00* | (2006.01) |
| *F25B 43/00* | (2006.01) |

(52) U.S. Cl.
CPC ......... *B60H 1/3223* (2013.01); *B60H 1/3229* (2013.01); *F04B 39/06* (2013.01); *F04B 39/14* (2013.01); *F25B 31/00* (2013.01); *F25B 43/006* (2013.01); *F25B 2500/28* (2013.01)

(58) Field of Classification Search
CPC .... B60H 1/3223; B60H 1/3229; F25B 43/006
See application file for complete search history.

(56) References Cited

U.S. PATENT DOCUMENTS

| | | | | |
|---|---|---|---|---|
| 4,600,367 | A | * | 7/1986 | Terauchi .............. B60H 1/3229 417/364 |
| 4,993,682 | A | * | 2/1991 | Imai ...................... B60H 1/3229 248/638 |
| 5,454,543 | A | * | 10/1995 | Carrico ................ B60H 1/3229 248/674 |
| 10,369,863 | B2 | * | 8/2019 | Connell ................ F25B 43/006 |
| 10,544,805 | B2 | * | 1/2020 | Ambo ................... F04B 39/121 |
| 11,097,592 | B2 | * | 8/2021 | Kagawa ............. B60H 1/00428 |
| 11,703,179 | B2 | * | 7/2023 | Kirchoff ................ F16M 13/02 248/674 |
| 11,936,251 | B2 | * | 3/2024 | Kobayashi ........... H03H 1/0007 |
| 2008/0095646 | A1 | * | 4/2008 | Nishii ..................... B60L 1/003 417/411 |
| 2017/0127566 | A1 | * | 5/2017 | Imura ..................... F04B 39/06 |
| 2022/0307500 | A1 | * | 9/2022 | Spies ................... B60H 1/3227 |
| 2024/0166019 | A1 | * | 5/2024 | Rhee .................... B60H 1/3227 |
| 2024/0181846 | A1 | * | 6/2024 | Lee ...................... B60H 1/3229 |

* cited by examiner

*Primary Examiner* — Christopher R Zerphey
(74) *Attorney, Agent, or Firm* — Slater Matsil, LLP (57) ABSTRACT

An embodiment compression module for a vehicle includes a compression unit configured to compress a refrigerant introduced into the compression unit, a control unit having a first surface separably assembled to the compression unit to control the compression unit, and an accumulator unit separably mounted on a second surface of the control unit in a direction opposite to the compression unit, the accumulator unit being configured to supply the refrigerant to the compression unit in a gaseous state.

20 Claims, 7 Drawing Sheets

COMPRESSION MODULE FOR VEHICLE

CROSS-REFERENCE TO RELATED APPLICATIONS

This application claims the benefit of Korean Patent Application No. 10-2022-0077328, filed on Jun. 24, 2022, which application is hereby incorporated herein by reference.

TECHNICAL FIELD

The present invention relates to a compression module for a vehicle.

BACKGROUND

In general, an air conditioning system for a vehicle includes an air conditioner device configured to circulate a refrigerant to heat or cool a vehicle interior.

The air conditioner device may maintain a comfortable indoor environment by maintaining an appropriate temperature in the vehicle interior regardless of a change in outside temperature. The vehicle interior is heated or cooled by heat exchange between a condenser and an evaporator during a process in which the refrigerant discharged by an operation of a compressor circulates back to the compressor via the condenser, a receiver drier, an expansion valve, and the evaporator.

That is, in a cooling mode in the summer season, the air conditioner device decreases a temperature and humidity in the vehicle interior as the high-temperature, high-pressure gaseous refrigerant, which is compressed by the compressor, is condensed by the condenser, and the refrigerant passes through the receiver drier and the expansion valve and then is evaporated by the evaporator.

Meanwhile, recently, as there is gradually increasing interest in energy efficiency and problems of environmental pollution, there is a need for development of environmental-friendly vehicles that can substantially replace internal combustion engine vehicles. The environmental-friendly vehicles are typically classified into an electric vehicle which operates by using fuel cells or electricity as a power source, and a hybrid vehicle that operates by using an engine and a battery.

Unlike an air conditioning device for a general vehicle, a separate heater is not used for an electric vehicle or a hybrid vehicle among the environmental-friendly vehicles. The air conditioning device applied to the environmental-friendly vehicle typically refers to a heat pump system.

In the heat pump system, there occurs a condition in which a sufficient degree of superheat of a refrigerant cannot be ensured in a heat exchanger such as the condenser and the evaporator before the refrigerant is introduced into the compressor. Therefore, an accumulator is essentially applied.

If the accumulator is not applied, a liquid refrigerant may be introduced into the compressor. For this reason, noise may occur in the compressor, and durability of the compressor may deteriorate.

However, in the case of the heat pump system in the related art, the compressor and the accumulator are configured as separate components and need to be connected through a tube. For this reason, there is a problem in that it is difficult to ensure a mounting space in a narrow space, and a layout of the connection tube is complicated.

In addition, in the related art, the tube needs to be assembled after the accumulator and the compressor are mounted, and the connection tube made of a hose material needs to be used in consideration of a relative vibration phase. For this reason, there is also a problem in that the number of work processes and manufacturing costs increase.

In addition, in the related art, a control unit provided in the compressor needs to be cooled by the refrigerant supplied from the accumulator, which makes it difficult to efficiently cool the control unit.

In addition, to efficiently cool the control unit provided in the compressor, a capacity of the accumulator needs to be increased or the control unit needs to be configured by using an element with a high guaranteed operating temperature, which causes a problem of increase in costs.

The above information disclosed in this background section is only for enhancement of understanding of the background of embodiments of the invention, and therefore it may contain information that does not form the prior art that is already known to a person of ordinary skill in the art.

SUMMARY

The present invention relates to a compression module for a vehicle. Particular embodiments relate to a compression module for a vehicle that is capable of serving as an accumulator and a compressor.

Embodiments of the present invention provide a compression module for a vehicle that is capable of serving as an accumulator and a compressor.

An exemplary embodiment of the present invention provides a compression module for a vehicle, the compression module including a compression unit configured to compress a refrigerant introduced into the compression unit, a control unit having one surface separably assembled to the compression unit to control the compression unit, and an accumulator unit separably mounted on the other surface of the control unit in a direction opposite to the compression unit, the accumulator unit being configured to supply a gaseous refrigerant to the compression unit.

The compression unit may further include one or more mounting guiders protruding toward the control unit to define a mounting groove in one surface on which the control unit is mounted.

The control unit may have one or more mounting protrusions corresponding to the one or more mounting guiders.

The one or more mounting protrusions may be slidably coupled to the mounting grooves.

The accumulator unit may have a heat exchange unit formed on one surface that is in close contact with the control unit.

The heat exchange unit may include a heat dissipation part provided on one surface of the accumulator unit corresponding to the other surface of the control unit, one or more heat dissipation fins provided on the heat dissipation part and configured to be in close contact with the other surface of the control unit, and a heat blocking ring mounted on an outer periphery of the heat dissipation part to prevent the heat dissipation part from exchanging heat with an external component, except for the control unit.

A plurality of heat dissipation fins may protrude from the heat dissipation part to the control unit and be provided in a preset zone of the heat dissipation part.

The heat blocking ring may be provided on one surface of the accumulator unit and provided in a ring groove formed along the outer periphery of the heat dissipation part.

The accumulator unit may be coupled to the compression unit by means of one or more fastening units provided on an outer periphery.

The one or more fastening units may be disposed outside the accumulator unit and respectively provided at positions symmetric at an angle of 180° with respect to an imaginary central axis passing through a center of the compression unit.

The one or more fastening units may be disposed on the outer periphery of the accumulator unit and provided at positions symmetric at an angle of 180° with respect to an imaginary central axis passing through a center of the compression unit, and the one or more fastening units may be disposed below the accumulator along an imaginary line extending in a direction perpendicular to the imaginary central axis.

Heat dissipation plates may be respectively mounted on one surface and the other surface of the control unit so that two opposite sides of the control unit are cooled by a refrigerant passing through an interior of the accumulator unit and a refrigerant introduced into the compression unit from the accumulator.

The compression module for a vehicle according to the embodiments of the present invention configured as described above may be applied and serve as the accumulator and the compressor, which makes it possible to reduce the number of components and assembling processes and improve a degree of layout freedom in a narrow space.

In addition, embodiments of the present invention enable the compression unit and the accumulator unit to directly exchange heat with the control unit, which makes it possible to optimize a capacity of the accumulator unit, decrease a guaranteed temperature of the element provided in the control unit, and reduce the overall amount of cost.

In addition, according to embodiments of the present invention, it is possible to minimize the use of the tube. Further, it is not necessary to ensure a mounting space for the accumulator that is separately mounted in the related art, which makes it possible to sufficiently utilize the internal space and improve the package layout.

The following reference identifiers may be used in connection with the accompanying drawings to describe exemplary embodiments of the present disclosure.

100: Compression module
110: Compression unit
112: Mounting groove
114: Mounting guider
120: Control unit
122: Mounting protrusion
124: Heat dissipation plate
130: Accumulator unit
132: Heat exchange unit
132a: Heat dissipation part
132b: Heat dissipation fin
132c: Heat blocking ring
132d: Ring groove
140: Connection tube

DETAILED DESCRIPTION OF ILLUSTRATIVE EMBODIMENTS

Hereinafter, exemplary embodiments of the present invention will be described in detail with reference to the accompanying drawings.

Therefore, the exemplary embodiments disclosed in the present specification and the configurations illustrated in the drawings are just the best preferred exemplary embodiments of the present invention and do not represent all of the technical spirit of the present invention. Accordingly, it should be appreciated that various equivalents and modified examples capable of substituting the exemplary embodiments may be made at the time of filing the present application.

A part irrelevant to the description will be omitted to clearly describe embodiments of the present invention, and the same or similar constituent elements will be designated by the same reference numerals throughout the specification.

The size and thickness of each component illustrated in the drawings are arbitrarily shown for ease of description, but the present invention is not necessarily limited thereto. In order to clearly describe several portions and regions, thicknesses thereof are enlarged.

Throughout the specification, unless explicitly described to the contrary, the word "comprise/include" and variations such as "comprises/includes" or "comprising/including" will be understood to imply the inclusion of stated elements, not the exclusion of any other elements.

In addition, the term "unit", "means", "part", "member", or the like, which is described in the specification, means a unit of a comprehensive configuration that performs at least one function or operation.

Figure 1:
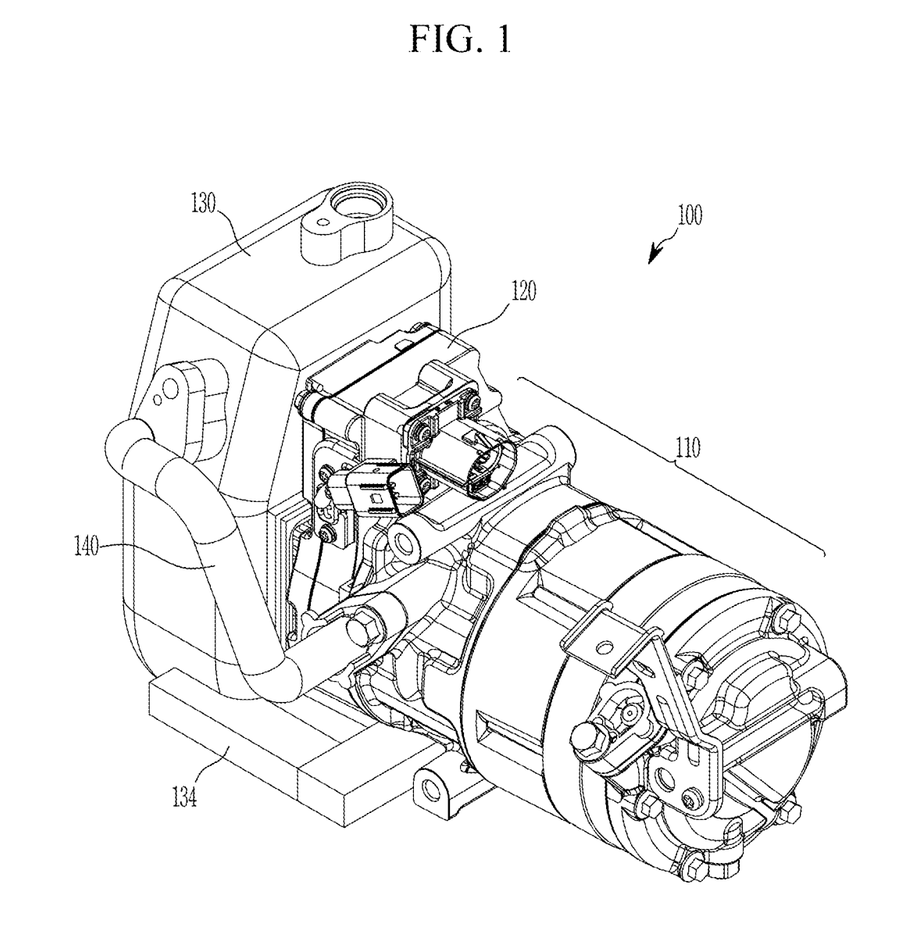
FIG. 1 is a perspective view of a compression module for a vehicle according to an embodiment of the present invention.
Figure 2:
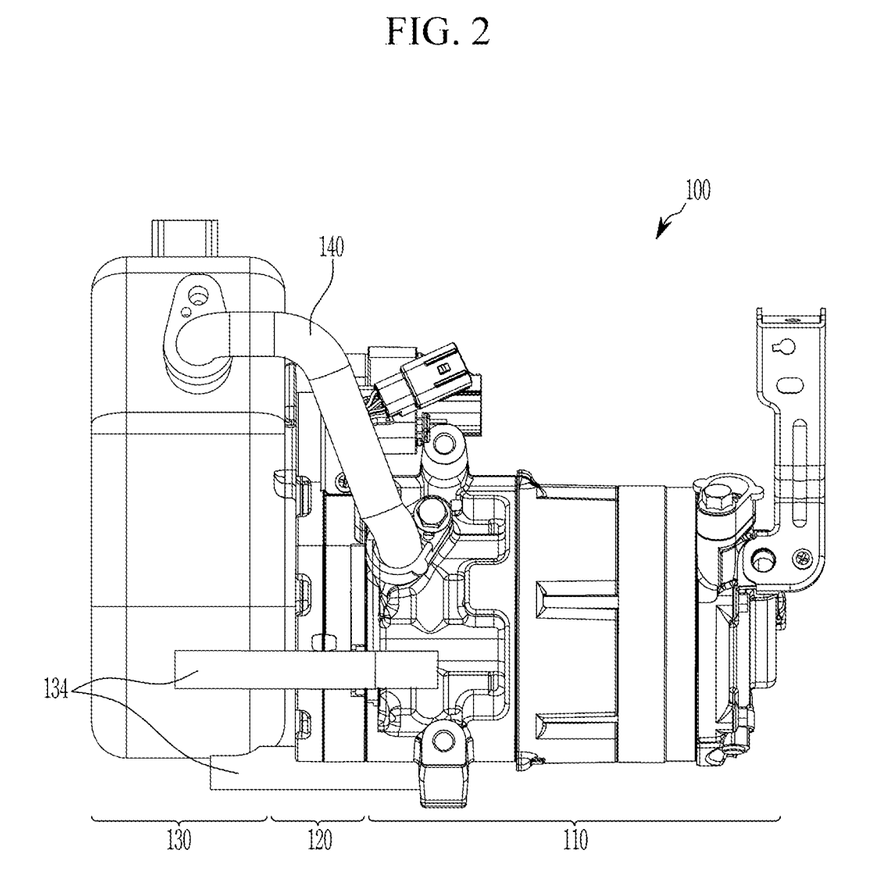
FIG. 2 is a front view of the compression module for a vehicle according to an embodiment of the present invention.
Figure 3:
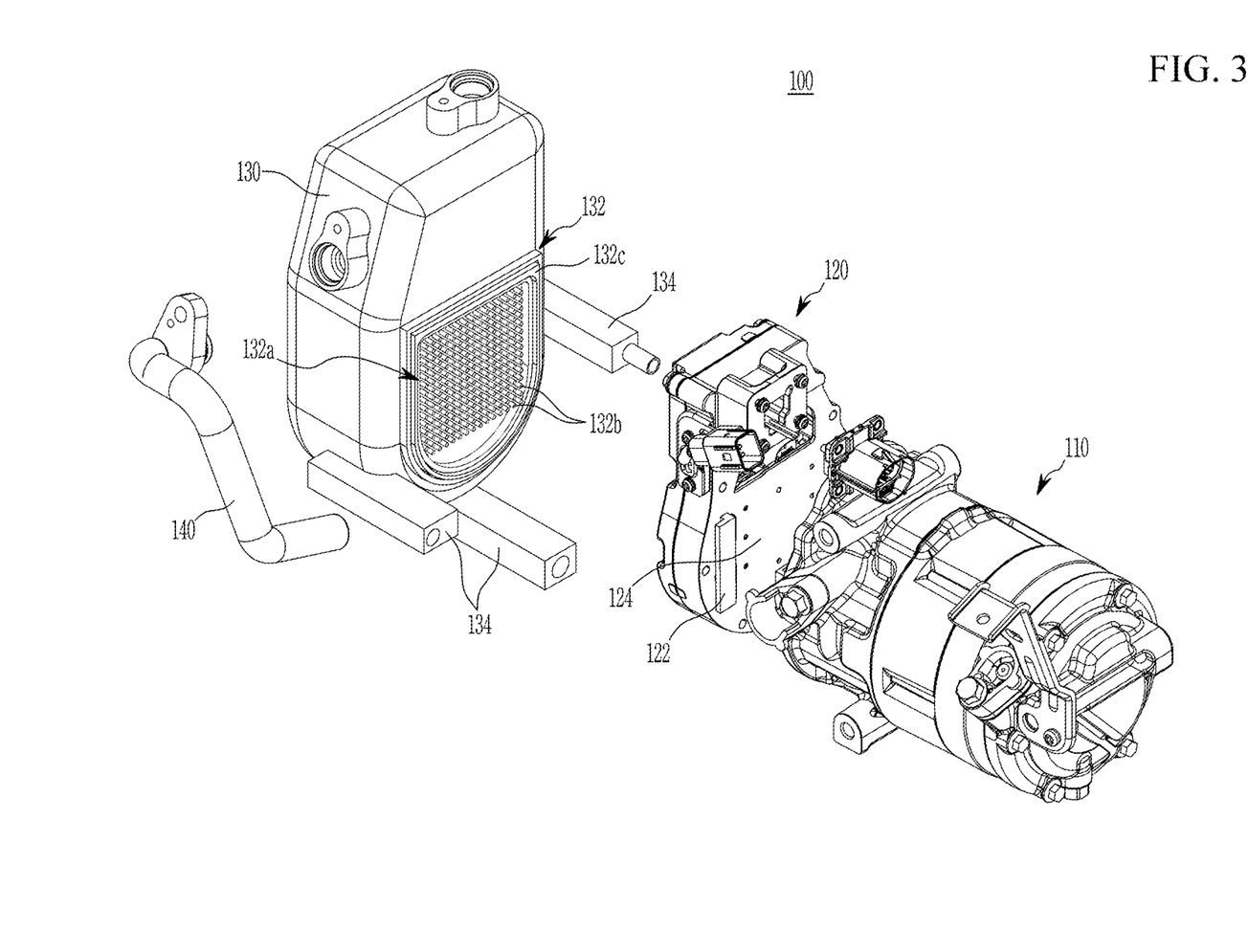
FIG. 3 is an exploded perspective view of the compression module for a vehicle according to an embodiment of the present invention.
Figure 4:
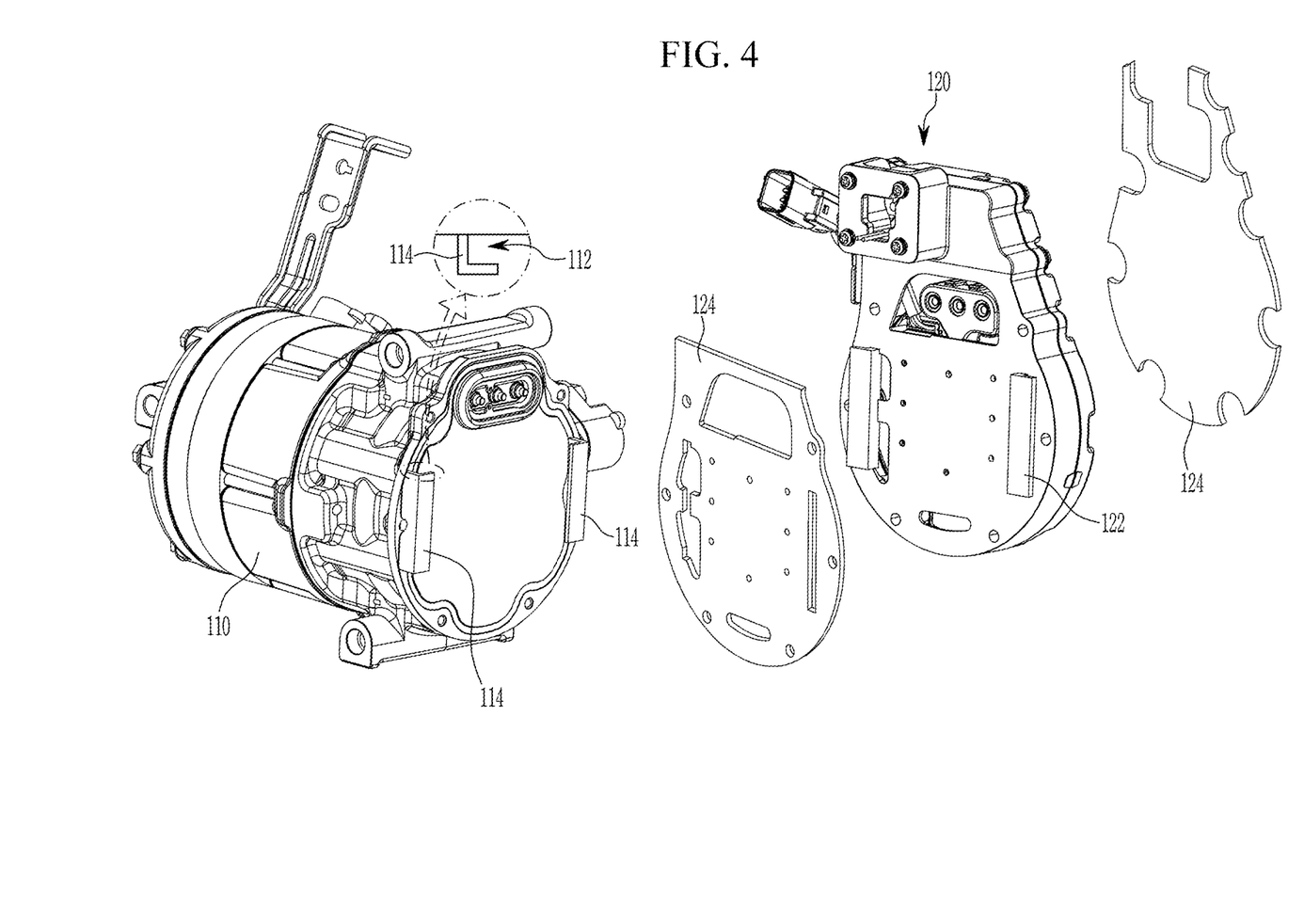
FIG. 4 is a perspective view of a compression unit and a control unit applied to the compression module for a vehicle according to an embodiment of the present invention.
Figure 5:
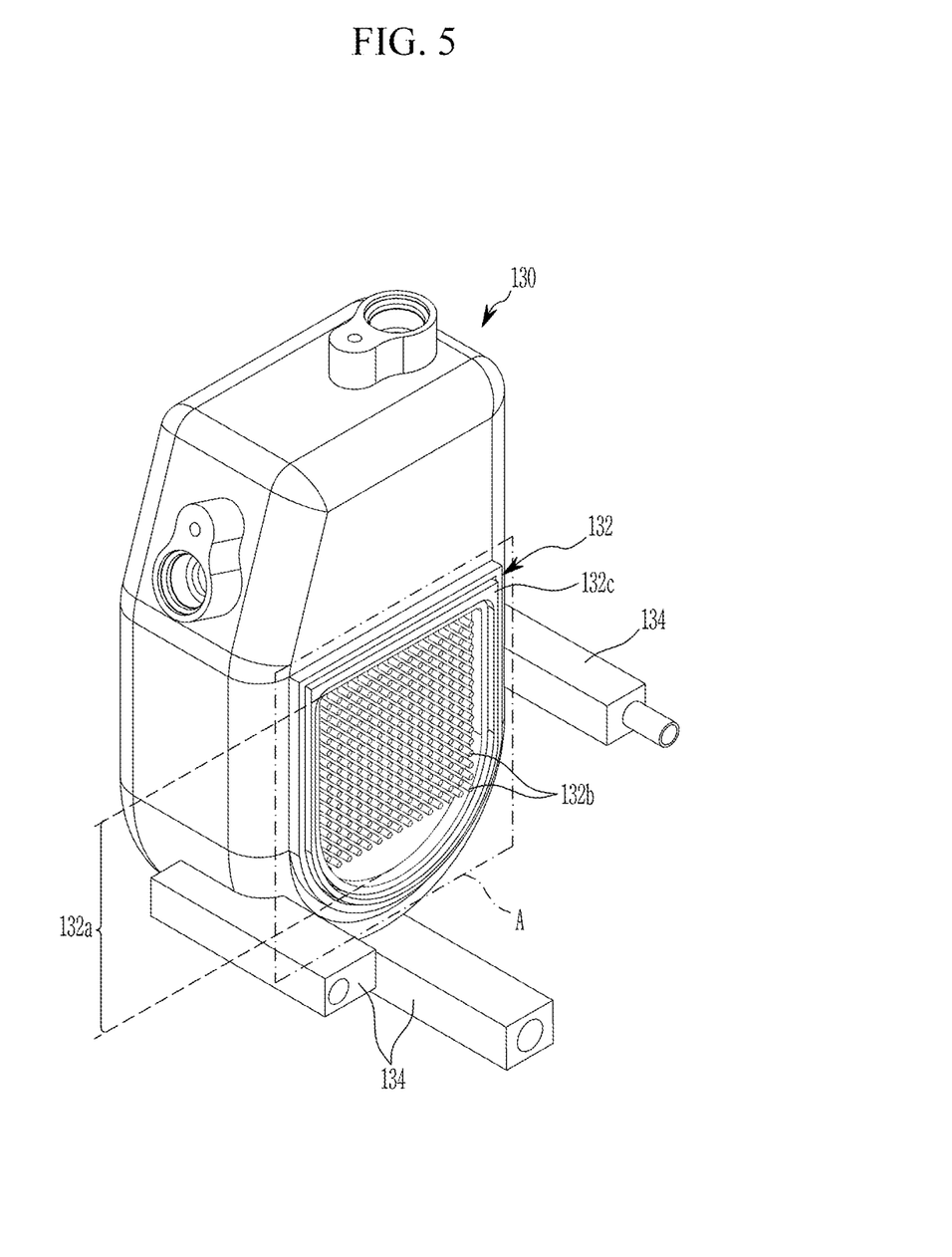
FIG. 5 is a perspective view of an accumulator unit applied to the compression module for a vehicle according to an embodiment of the present invention.
Figure 6:
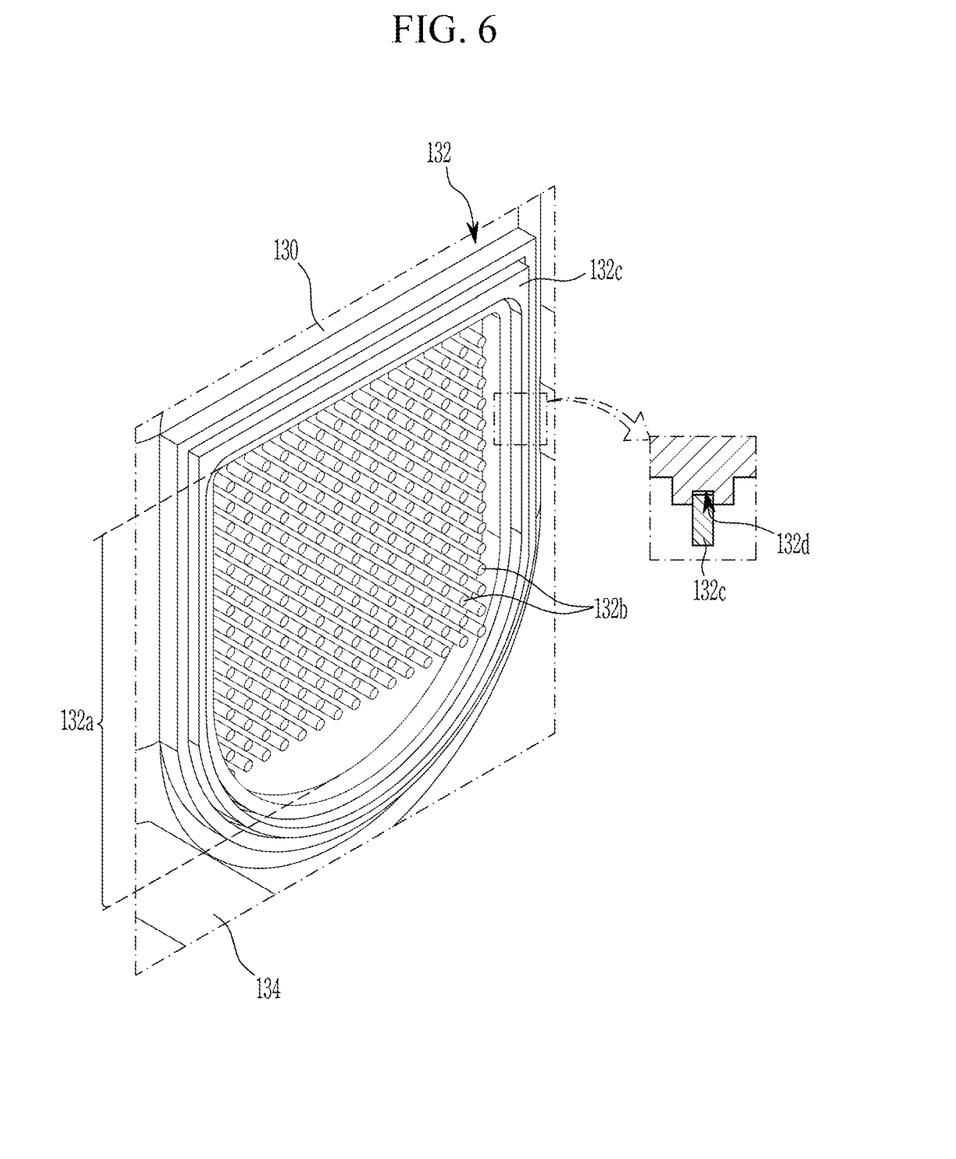
FIG. 6 is an enlarged cross-sectional view of part A in FIG. 5.
Figure 7:
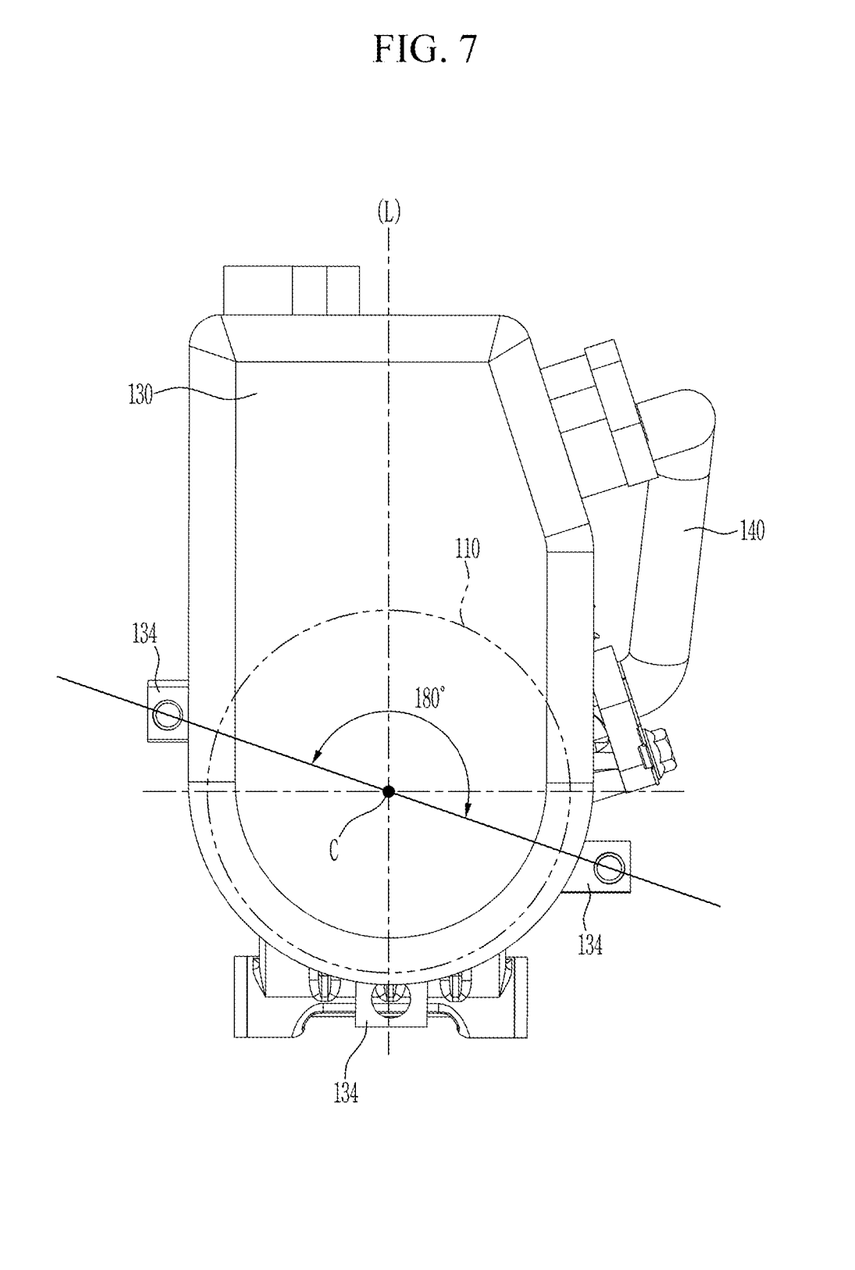
FIG. 7 is a side view of the compression module for a vehicle according to an embodiment of the present invention.

FIG. 1 is a perspective view of a compression module for a vehicle according to an embodiment of the present invention, FIG. 2 is a front view of the compression module for a vehicle according to an embodiment of the present invention, FIG. 3 is an exploded perspective view of the compression module for a vehicle according to an embodiment of the present invention, FIG. 4 is a perspective view of a compression unit and a control unit applied to the compression module for a vehicle according to an embodiment of the present invention, FIG. 5 is a perspective view of an accumulator unit applied to the compression module for a vehicle according to an embodiment of the present invention, FIG. 6 is an enlarged cross-sectional view of part A in FIG. 5, and FIG. 7 is a side view of the compression module for a vehicle according to an embodiment of the present invention.

Referring to the drawings, a compression module 100 for a vehicle according to an embodiment of the present invention may serve as an accumulator and a compressor.

As illustrated in FIGS. 1 to 3, the compression module 100 may include a compression unit 110, a control unit 120, and an accumulator unit 130.

First, the compression unit 110 may compress a refrigerant introduced into the compression unit 110. The compression unit 110 may compress the refrigerant, which is introduced into the compression unit 110, by means of an operation of a motor typically provided in the compression unit 110.

In this case, examples of the compression unit 110 may be classified into a reciprocating compression unit, a rotary compression unit, a screw compression unit, and a centrifugal compression unit depending on the method of compressing the refrigerant.

The control unit 120 may have one surface separably mounted on the compression unit 110 to control an operation of the compression unit 110.

The control unit 120 may control the operation of the compression unit 110 in response to a control signal transmitted from a non-illustrated controller.

In this case, as illustrated in FIG. 4, the compression unit 110 may further include a pair of mounting guiders 114 protruding toward the control unit 120 so that a pair of mounting grooves 112 is formed in one surface on which the control unit 120 is mounted.

The mounting guiders 114 may be provided on one surface of the compression unit 110 and formed at positions symmetric in a width direction of the compression unit 110.

Further, a pair of mounting protrusions 122 may be formed on one surface of the control unit 120 corresponding to the pair of mounting guiders 114. The pair of mounting protrusions 122 may be slidably coupled to the mounting grooves 112.

That is, the control unit 120 may be coupled to the compression unit no by means of a sliding assembling structure in which the mounting protrusions 122 are fitted with the mounting grooves 112 in an upward/downward direction such that the control unit 120 may slide upward or downward relative to the compression unit 110.

Therefore, the compression unit no and the control unit 120 may be conveniently coupled, and the control unit 120 may be easily separated from the compression unit no, which may improve maintenance performance.

In the present embodiment, the accumulator unit 130 may be separably mounted on the other surface of the control unit 120 in a direction opposite to the compression unit no. The accumulator unit 130 may be connected to the compression unit no through a connection tube 140 to supply a gaseous refrigerant to the compression unit no.

In this case, as illustrated in FIGS. 5 and 6, the accumulator unit 130 may have a heat exchange unit 132 formed on one surface that is in close contact with the control unit 120.

The heat exchange unit 132 may include a heat dissipation part 132a, one or more heat dissipation fins 132b, and a heat blocking ring 132c.

First, the heat dissipation part 132a is formed on one surface of the accumulator unit 130 while corresponding to the other surface of the control unit 120.

The heat dissipation part 132a may be similar in shape to a printed circuit board (PCB) provided in the control unit 120.

The one or more heat dissipation fins 132b may be formed integrally with the heat dissipation part 132a and be in close contact with the other surface of the control unit 120.

In this case, the plurality of heat dissipation fins 132b may protrude from the heat dissipation part 132a to the control unit 120 and be provided in a preset zone of the heat dissipation part 132a.

The plurality of the heat dissipation fins 132b configured as described above may allow cold air (chilly air) generated from the refrigerant introduced into the accumulator unit 130 to exchange heat with the control unit 120, thereby efficiently cooling the other surface of the control unit 120.

Meanwhile, one surface of the control unit 120 may be cooled by the refrigerant introduced into the compression unit 110 from the accumulator unit 130.

That is, two opposite surfaces of the PCB provided in the control unit 120 may be efficiently cooled by the compression unit 110 and the heat exchange unit 132.

That is, because the control unit 120 may be efficiently cooled, elements with a low guaranteed temperature may be provided in and applied to the control unit 120, which makes it possible to reduce manufacturing costs.

In this case, heat dissipation plates 124 may be respectively mounted on one surface and the other surface of the control unit 120 so that the two opposite sides of the control unit may be more efficiently cooled by the refrigerant passing through an interior of the accumulator unit 130 and the refrigerant introduced into the compression unit 110 from the accumulator unit 130.

The heat dissipation plates 124 may further improve the heat exchange efficiency of the control unit 120 implemented by the compression unit 110 and the heat exchange unit 132.

Further, the heat blocking ring 132c may be mounted on an outer periphery of the heat dissipation part 132a to prevent the heat dissipation part 132a from exchanging heat with an external component, except for the control unit 120.

In this case, the heat blocking ring 132c may be provided on one surface of the accumulator unit 130 and mounted in a ring groove 132d formed along the outer periphery of the heat dissipation part 132a.

The heat blocking ring 132c configured as described above prevents the heat dissipation fins 132b from exchanging heat with the outside air, thereby improving the heat exchange efficiency of the control unit 120 and the heat exchange unit 132.

Meanwhile, the accumulator unit 130 may be coupled to the compression unit 110 by means of one or more fastening units 134 provided on a lower outer periphery thereof.

As illustrated in FIG. 7, an at least two-point fastening structure or an at least three-point fastening structure may be applied to the one or more fastening units 134.

First, in a case in which the two-point fastening structure is applied to the one or more fastening units 134, the one or more fastening units 134 may be disposed outside the accumulator unit 130 and respectively provided at positions symmetric at an angle of 180° with respect to an imaginary central axis C passing through a center of the compression unit 110.

In contrast, in a case in which the three-point fastening structure is applied to the one or more fastening units 134, the one or more fastening units 134 may be disposed on the outer periphery of the accumulator unit 130 and provided at the positions symmetric at an angle of 180° with respect to the imaginary central axis C passing through the center of the compression unit 110, and the one or more fastening units 134 may be disposed below the accumulator unit 130 along an imaginary line L extending in a direction perpendicular to the imaginary central axis C.

The fastening units 134 may stably mount the accumulator unit 130 on the compression unit 110.

At the same time, the fastening units 134 may ensure torsional rigidity of the accumulator unit 130 when torsion, which is generated by rotational vibration of the compression unit 110, is applied to the accumulator unit 130.

Therefore, the compression module 100 for a vehicle according to an embodiment of the present invention configured as described above may be applied and serve as the accumulator and the compressor, which makes it possible to reduce the number of components and assembling processes and improve a degree of layout freedom in a narrow space.

In addition, embodiments of the present invention enable the compression unit 110 and the accumulator unit 130 to directly exchange heat with the control unit 120, which makes it possible to optimize a capacity of the accumulator unit 130, decrease a guaranteed temperature of the element provided in the control unit 120, and reduce the overall amount of cost.

In addition, according to embodiments of the present invention, it is possible to minimize the use of the tube. Further, it is not necessary to ensure a mounting space for the accumulator that is separately mounted in the related art, which makes it possible to sufficiently utilize the internal space and improve the package layout.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A compression module for a vehicle, the compression module comprising:
a compression unit configured to compress a refrigerant introduced into the compression unit;
a controller having a first surface separably assembled to the compression unit to control the compression unit; and
an accumulator unit separably mounted on a second surface of the controller in a direction opposite to the compression unit, the accumulator unit being configured to supply the refrigerant to the compression unit in a gaseous state, wherein:
the accumulator unit has a heat exchange unit provided on one surface that is in close contact with the controller, the heat exchange unit comprising:
a heat dissipation part provided on a surface of the accumulator unit corresponding to the second surface of the controller,
one or more heat dissipation fins provided on the heat dissipation part and configured to be in close contact with the second surface of the controller, and
a heat blocking ring mounted on an outer periphery of the heat dissipation part and configured to prevent the heat dissipation part from exchanging heat with an external component, except for the controller,
the compression unit comprises one or more mounting guiders protruding toward the controller to define mounting grooves in one surface on which the controller is mounted,
the controller comprises one or more mounting protrusions corresponding to the one or more mounting guiders, and
the one or more mounting protrusions are slidably coupled to the mounting grooves.

2. The compression module of claim 1, further comprising heat dissipation plates respectively mounted on the first surface and the second surface of the controller so that two opposite sides of the controller are cooled by the refrigerant passing through an interior of the accumulator unit and the refrigerant introduced into the compression unit from the accumulator unit.

3. The compression module of claim 1, wherein the heat dissipation fins protrude from the heat dissipation part to the controller and are provided in a preset zone of the heat dissipation part.

4. The compression module of claim 1, wherein the heat blocking ring is provided on one surface of the accumulator unit and is provided in a ring groove defined along the outer periphery of the heat dissipation part.

5. A compression module for a vehicle, the compression module comprising:
a compression unit configured to compress a refrigerant introduced into the compression unit;
a controller having a first surface separably assembled to the compression unit to control the compression unit; and
an accumulator unit separably mounted on a second surface of the controller in a direction opposite to the compression unit, the accumulator unit being configured to supply the refrigerant to the compression unit in a gaseous state, and the accumulator unit having a heat exchange unit provided on one surface that is in close contact with the controller, wherein the heat exchange unit comprises:
a heat dissipation part provided on a surface of the accumulator unit corresponding to the second surface of the controller,
one or more heat dissipation fins provided on the heat dissipation part and configured to be in close contact with the second surface of the controller, and
a heat blocking ring mounted on an outer periphery of the heat dissipation part and configured to prevent the heat dissipation part from exchanging heat with an external component, except for the controller.

6. The compression module of claim 5, wherein the heat dissipation fins protrude from the heat dissipation part to the controller and are provided in a preset zone of the heat dissipation part.

7. The compression module of claim 5, wherein the heat blocking ring is provided on one surface of the accumulator unit and is provided in a ring groove defined along the outer periphery of the heat dissipation part.

8. The compression module of claim 5, wherein the accumulator unit is coupled to the compression unit with one or more fastening units provided on an outer periphery of the accumulator unit.

9. The compression module of claim 8, wherein the one or more fastening units are disposed outside the accumulator unit and are respectively provided at positions symmetric at an angle of 180° with respect to an imaginary central axis passing through a center of the compression unit.

10. The compression module of claim 9, wherein the fastening units form a two-point fastening structure.

11. The compression module of claim 8, wherein the one or more fastening units are disposed on the outer periphery of the accumulator unit and are provided at positions symmetric at an angle of 180° with respect to an imaginary central axis passing through a center of the compression unit, and wherein the one or more fastening units are disposed below the accumulator unit along an imaginary line extending in a direction perpendicular to the imaginary central axis.

12. The compression module of claim 5, further comprising heat dissipation plates respectively mounted on the first surface and the second surface of the controller so that two opposite sides of the controller are cooled by the refrigerant passing through an interior of the accumulator unit and the refrigerant introduced into the compression unit from the accumulator unit.

13. The compression module of claim 11, wherein the fastening units form a three-point fastening structure.

14. A compression module for a vehicle, the compression module comprising:
   a compression unit configured to compress a refrigerant introduced into the compression unit;
   a controller having a first surface separably assembled to the compression unit to control the compression unit, wherein the controller comprises mounting protrusions corresponding to mounting guiders provided in the compression unit, wherein the mounting guiders protrude toward the controller to define mounting grooves in one surface on which the controller is mounted, and wherein the mounting protrusions are slidably coupled to the mounting grooves;
   an accumulator unit separably mounted on a second surface of the controller in a direction opposite to the compression unit, the accumulator unit being configured to supply the refrigerant to the compression unit in a gaseous state, wherein the accumulator unit has a heat exchange unit provided on one surface that is in close contact with the controller, the heat exchange unit comprising:
      a heat dissipation part provided on a surface of the accumulator unit corresponding to the second surface of the controller,
      one or more heat dissipation fins provided on the heat dissipation part and configured to be in close contact with the second surface of the controller, and
      a heat blocking ring mounted on an outer periphery of the heat dissipation part and configured to prevent the heat dissipation part from exchanging heat with an external component, except for the controller; and
   heat dissipation plates respectively mounted on the first surface and the second surface of the controller so that two opposite sides of the controller are cooled by the refrigerant passing through an interior of the accumulator unit and the refrigerant introduced into the compression unit from the accumulator unit.

15. The compression module of claim 14, wherein the heat dissipation fins protrude from the heat dissipation part to the controller and are provided in a preset zone of the heat dissipation part.

16. The compression module of claim 14, wherein the heat blocking ring is provided on one surface of the accumulator unit and is provided in a ring groove defined along the outer periphery of the heat dissipation part.

17. The compression module of claim 14, wherein:
   the accumulator unit is coupled to the compression unit with fastening units provided on an outer periphery of the accumulator unit; and
   the fastening units are disposed outside the accumulator unit and are respectively provided at positions symmetric at an angle of 180° with respect to an imaginary central axis passing through a center of the compression unit.

18. The compression module of claim 17, wherein the fastening units form a two-point fastening structure.

19. The compression module of claim 14, wherein:
   the accumulator unit is coupled to the compression unit with fastening units provided on an outer periphery of the accumulator unit;
   the fastening units are disposed on the outer periphery of the accumulator unit and are provided at positions symmetric at an angle of 180° with respect to an imaginary central axis passing through a center of the compression unit; and
   the fastening units are disposed below the accumulator unit along an imaginary line extending in a direction perpendicular to the imaginary central axis.

20. The compression module of claim 19, wherein the fastening units form a three-point fastening structure.

* * * * *